United States Patent Office 3,065,246
Patented Nov. 20, 1962

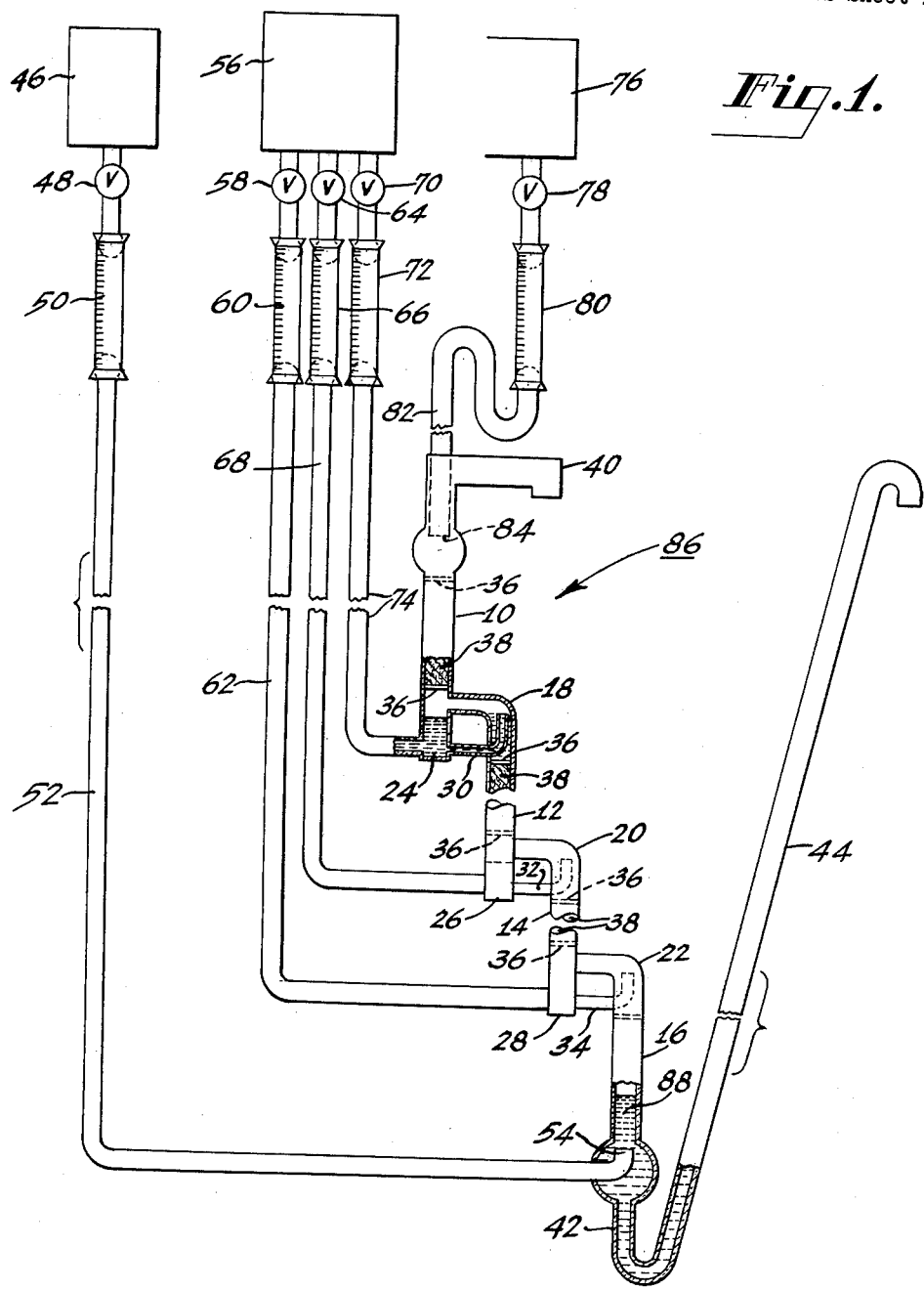

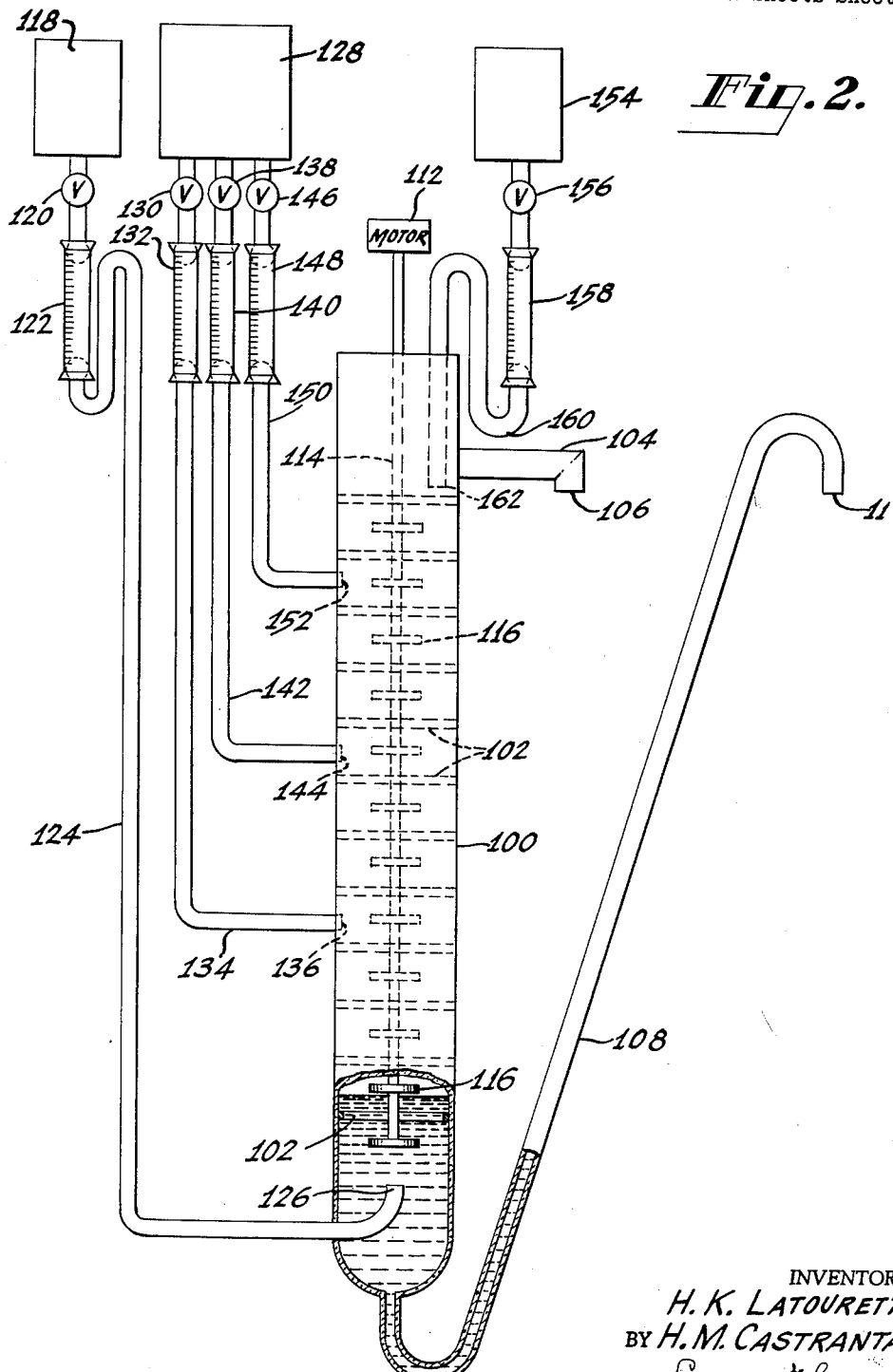

3,065,246
CONTINUOUS EPOXIDATION METHOD
Harold K. Latourette, Pennington, and Harry M. Castrantas, Trenton, N.J., assignors to FMC Corporation, a corporation of Delaware
Filed Oct. 6, 1959, Ser. No. 844,695
9 Claims. (Cl. 260—348.5)

This invention relates to a method of epoxidizing ethylenic compounds by reacting them with carboxylic peracids formed in situ in the reaction mixture, and particularly to such a method in which the reaction is conducted continuously by counter-current contact of reagents in a column.

The herein invention is an improvement over the process recited in our prior copending application Serial Number 844,245 entitled "Continuous Epoxidation Method," and filed September 29, 1959.

Epoxidized unsaturated fatty esters and other olefinic compounds are employed commercially in such applications as plasticizers and stabilizers for polymers, acid scavengers, and the like. These epoxidized compounds are produced by reacting olefinic bonds in the ethylenic compounds with an aliphatic carboxylic peracid, for example with peracetic acid or performic acid. This results in the addition of one oxygen atom to the ethylenic compound at the site of each olefin bond which is reacted, forming an oxirane (epoxy) group. This reaction is illustrated by the following equation:

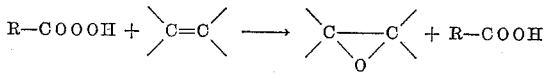

Heretofore, the epoxidation of ethylenic compounds has been carried out in batch operations in which the reaction is either carried out completely in one reaction vessel, or the ethylenic compound is progressively epoxidized in a series of vessels. It has been preferred to form the peracid in situ in the solution of ethylenic compound to be epoxidized. This is accomplished by adding aqueous hydrogen peroxide to a solution containing the ethylenic compound and an aliphatic carboxylic acid, while maintaining the solution under a high degree of agitation. The hydrogen peroxide reacts with the aliphatic carboxylic acid as follows:

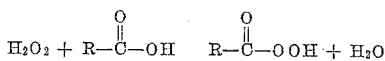

An acid catalyst, suitably sulfuric acid, is normally added to the solution to catalyze production of the peracid. Greenspan and Gall, in U.S. Patent 2,801,253, teach a typical in situ batch epoxidation employing acetic acid as their aliphatic carboxylic acid.

The major difficulties encountered in using in situ peracid batch techniques are the undesirably high degree of opening of oxirane rings which occurs, and the relatively long time required for the desired epoxidation reaction. Ring opening of the oxirane ring proceeds typically with the formation of a glycol or its half ester derived from the oxirane compound. This reaction may be illustrated by the following equations:

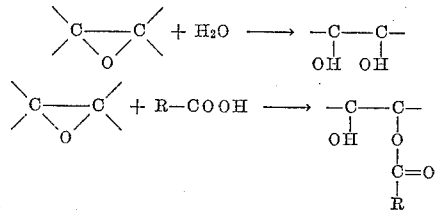

The conditions which accelerate ring opening are the same conditions which result in high rates of epoxidation; these are, high temperature, high concentration of the aliphatic acid, and high hydrogen ion concentrations. Furthermore, the lengthy time of contact between the oxirane group and the aliphatic acid solution promotes ring opening. Therefore, the epoxidation conditions which are employed in the prior art are a compromise which provide commercially permissible epoxidation rates, with minimum ring opening.

The excessive reaction time required in batch systems is due to the increasingly small concentrations of both the peracid and the unreacted ethylenic compound present in the batch reactor as the reaction proceeds. This is by reason of the law of mass action, which dictates reaction rates. In the multi-vessel processes a series of epoxidations, each having the characteristics of a batch reaction, is carried out, with the reactants in each succeeding stage being reacted to a progressively higher epoxidation level, and the aqueous and oil phases separated for further use.

It is an object of the present invention to provide a continuous epoxidation method.

It is a further object of this invention to provide an epoxidation method in which the reaction proceeds rapidly, with minimum ring opening.

These and other objects of the invention will be more fully apparent from the following description.

It has now been found that ethylenic compounds can be epoxidized in a continuous process, at a surprisingly high rate, and with a surprisingly slight destruction of sensitive epoxy groups in the product. The time required to epoxidize a given quantity of ethylenic compound is only a fraction of the time required in previous batch epoxidation processes. At the same time, lesser amounts of ring opening are obtained than were previously encountered.

These ends are accomplished in accordance with the present method by introducing an ethylenic compound into one end of an elongated reaction zone, introducing aqueous hydrogen peroxide into the other end of said reaction zone, introducing intermediate the ends of said reaction zone, an aliphatic carboxylic acid containing from 1 to 8 carbon atoms, and passing the ethylenic compound continuously and countercurrently with, and in intimate contact with an aqueous phase comprising said hydrogen peroxide, said carboxylic acid, and carboxylic peracid formed in the reaction mixture.

More specifically, it has been determined that if the aliphatic carboxylic acid is introduced into the reaction zone at a point substantially removed from the end of the reaction zone in which the hydrogen peroxide is added, the aqueous hydrogen peroxide selectively extracts the aliphatic carboxylic acid from the epoxidized ethylenic compound as it nears the end of the column from which it is removed as product, thereby removing acids from the epoxidized product and substantially reducing ring opening of the sensitive epoxy ring. It is desirable that gas pockets not be permitted to form in the reaction zone, as they reduce the reaction yield, and the reaction preferably will be conducted in a manner to avoid their formation.

The present method is an improvement over our prior filed copending application, entitled "Continuous Epoxidation Method," referred to herein above. The prior application teaches and claims a method of epoxidizing ethylenic compounds by running them through an elongated reaction zone in countercurrent to an epoxidizing reagent, employing good contacting means which disperse gases present in the reaction zone. The present method, involving addition of a portion of the epoxidizing reagent at a point intermediate to the ends of the reaction zone, provides much improved results over the method of the prior application.

In the present process, an ethylenic compound is passed into one end of an elongated reaction zone, while an aqueous solution of hydrogen peroxide is introduced at the other end. In a system employing butyl oleate as the ethylenic compound, and acetic acid as the aliphatic carboxylic acid, the butyl oleate is introduced at the base of the reaction zone and flows upwardly in countercurrent to an immiscible aqueous solution of hydrogen peroxide flowing downwardly in the reaction zone. The aliphatic carboxylic acid, acetic acid, is then introduced through the side of the reaction zone at one or a plurality of points. A strong acid, e.g. sulfuric acid, is added with the carboxylic acid as a catalyst, to increase the rate of peracid production. The aqueous hydrogen peroxide droplets fall downward through the butyl oleate and contact any acetic acid which is dissolved in the butyl oleate. The acetic acid is more soluble in the aqueous medium than in the butyl oleate, or oil medium, and is thus extracted by the aqueous droplets. The acetic acid and hydrogen peroxide react to form peracetic acid within the aqueous droplets and the peracetic acid reacts with the butyl oleate to form butyl epoxy stearate. The epoxidation reaction reforms acetic acid, which is then free to react with more hydrogen peroxide to again form peracetic acid, until all of the hydrogen peroxide is consumed or the desired degree of epoxidation has occurred.

When the ethylenic oil passes into the bottom of the reaction zone, it first contacts the spent aqueous solution of hydrogen peroxide and preferably contacts a layer of aqueous material which is allowed to accumulate for this purpose. This has the advantage to purging the ethylenic feed material of water-soluble impurities and also of foreign matter which might act to catalytically decompose hydrogen peroxide which is present in its unreacted state in the column. Loss of hydrogen peroxide by catalytic decomposition is thus minimized. As the ethylenic compound travels upward in the reaction zone, it is subject to constant epoxidation until it reaches the highest acetic acid entry point.

The rate of epoxidation throughout this ascent is much more uniform and rapid than is achieved with similar batch processes, since the concentration of at least one of the reactants, the peracid or the olefinic compound, is always high throughout the reaction zone. In contrast to this, single or series batch processes have very small concentrations of both peracid and unreacted ethylenic feed components present during a large part of the reaction. Since the reaction rate varies with the concentration of both feed components, the instant process requires shorter reaction times than the batch type processes.

When the epoxidized oil passes the highest acetic acid entry point in the reaction zone, it is contacted by a shower of descending aqueous hydrogen peroxide droplets. These droplets initially absorb acetic acid which is dissolved in the butyl oleate. The acetic acid preferentially dissolves in the water phase because of its preferential solubility in water and hydrogen peroxide. Therefore, since high concentrations of acetic acid are removed from contact with the epoxidized butyl oleate in the upper section of the reaction zone, this process is extremely effective in removing acids from the epoxidized product, and thereby in reducing ring opening of the epoxidized product. Also, ring opening is diminished because of the shortened time of contact between the highly epoxidized product and the concentrated acid.

The butyl epoxy stearate recovered from the present process has a much lower concentration of carboxylic acid than that obtained by equivalent batch methods, and therefore requires a minimum of purification to remove unreacted starting materials. This obviates elaborate and expensive purification procedures.

It has been found that the amount of hydrogen peroxide required in the present process is less than that required when conducting batch type processes. The saving in hydrogen peroxide is obtained in part by reducing the amount of hydrogen peroxide which decomposes. This decomposition is accelerated by impurities, which tend to catalyze the decomposition, and by excessive reaction times. The present process avoids these sources of decomposition because the high reaction rates obtained by this countercourrent process decreases the epoxidation reaction time, and because the ethylenic feed is initially extracted with an aqueous layer, thereby removing any water-soluble impurities which might have a catalytic action on the hydrogen peroxide.

As an additional feature, it has been found desirable to carry out the present process in a reaction zone equipped with peracid reservoir zones. These zones are small hold-up areas in the reaction zone in which quiescent pools containing mixtures of aqueous hydrogen peroxide and aliphatic acid form. The peracid reservoir zones act as reaction zones within the column, so that improved concentrations of peracid are formed by reaction of the hydrogen peroxide and the aliphatic acid.

The present process may be carried out in any packed column in which a high mass transfer between the immiscible oil and water phases may be obtained, and in which the accumulation of gas pockets is minimized. A packed column employing Berl saddles as packing has been found quite suitable. Use of packings whose largest cross-sectional dimension is less than about 4 mm. has been found to promote formation of gas pockets, and is not desirable. The reaction may likewise be carried out in a mechanically agitated multi-compartment extraction column such as a rotating disc contactor of the type reported in Chemical Engineering Progress, March 1955, vol. 51, p. 141. In this type of column, intimate contact between the oil and aqueous phases is obtained by the mechanically agitated rotating discs. The baffle rings in this type of column act to hold up the aqueous phase during its flow through the column, thereby increasing contact time between the two phases. This type of column also has the advantages that in it the exothermic heat produced by the epoxidation reaction is more easily dissipated, and that gas pocket formation is minimized.

This process has been found suited to the epoxidation of a variety of compounds containing ethylenic unsaturation. These compounds may be acids, esters, alcohols, hydrocarbons, or other compounds containing an unsaturated aliphatic group which may be readily epoxidized as taught by Swern in Chemical Reviews (1949), vol. 45, p. 1–68. However, it is well known in the art as taught by Swern, that compounds having substituted electron attracting groups, such as halogens, ether, carbonyl, nitro, ketone, aldehyde, cyanide, or ester groups, and the like, in a position alpha to the ethylenic bond, are not easily epoxidized with aliphatic peracids. The ethylenic compounds selected for epoxidation, moreover, must not otherwise react with the added peroxide, or aliphatic carboxylic acid, except in the epoxidation reaction. More specifically, compounds such as methyl oleate, cottonseed oil, olyl oleate, soybean oil, olive oil, butyl oleate, the methyl ester of soya fatty acids, the butyl ester of soya fatty acids, the methyl ester of cottonseed fatty acids, oleic acid, oleyl alcohol, dodocene, and butadiene polymers and copolymers may be epoxidized by the present method.

The peracids which may be employed in this process are those derived from the aliphatic carboxylic acids having from 1 to 8 carbon atoms. The preferred range of aliphatic carboxylic acids are those containing 1 to 3 carbon atoms. The carboxylic acids employed may be monobasic or polybasic acids, and may have reactive groups substituted thereon such as halogen or hydroxyl groups. Examples of such substituted aliphatic carboxylic acids are monochloroacetic, pyruvic, citric and oxalic acids.

The acid catalyst, which is added with the aliphatic carboxylic acid, may be any strong mineral or organic acid, such as those conventionally employed in the epoxidation art. The preferred mineral acids are sulfuric and phosphoric acids. Strong organic acids which have been found suitable are trihaloacetic acids such as trichloroacetic acid, methane sulfonic acid, and toluene sulfonic acid, or sulfonic acid cation exchange resins.

The present reaction can be conducted between about 30° and about 100° C. While the reaction may be run at less than about 30° C., the reaction at such low temperatures is too slow for many applications. However, the reaction will proceed below 30° C., and such operation is within the contemplation of the present method. The preferred range of operation is generally between 50° and 90° C., depending upon the particular ethylenic compound to be epoxidized. An optimum range of 60–70° C. exists for most of the common ethylenic feeds employed. It is important that the reaction be run at temperatures no higher than about 100° C., in order to avoid undue ring opening. This necessitates careful temperature control in epoxidation column, because the epoxidation reaction is a vigorously exothermic reaction, releasing about 59.8 kilocalories per gram mole of ethylenic unsaturation being reacted. Suitable means for dissipating this heat throughout the system is therefore desirable. The reaction in the column is run at atmospheric pressure, although superatmospheric pressure may be employed, if desired.

The hydrogen peroxide, which is added at the top of the column, is normally added in the amount of about 1.0 to about 1.2 moles per mole of ethylenic unsaturation to be epoxidized. If smaller quantities of hydrogen peroxide are employed, incomplete epoxidation results. Higher quantities of hydrogen peroxide, that is above 1.2 moles per mole of ethylenic unsaturation, may be employed if desired, but economic considerations normally dictate minimum amounts of the peroxide.

The concentration of the aqueous hydrogen peroxide solution employed may range from about 27% by weight to about 98% by weight of the peroxide. The lowest concentration of hydrogen peroxide which may be used is governed by the reaction rate of the more dilute solutions in forming the peracid. Aqueous solutions of hydrogen peroxide below 27% by weight react slowly to form peracid, and for this reason their use is not desirable, although it is possible. The preferred concentration of aqueous hydrogen peroxide ranges from 45 to 55% by weight. When employing concentrations of aqueous hydrogen peroxide above about 50% by weight, pecial precautions must be observed to prevent explosions, since such mixtures may enter the range of explosive compositions for this system.

The aliphatic carboxylic acid normally is employed in as concentrated form as is practically possible. In the case of acetic acid, for example, glacial acetic acid is used. The amount of lower aliphatic acid added is between 0.25 to 1 mole per mole of ethylenic unsaturation desired to be epoxidized, depending upon the particular olefinic feed employed. The amount of carboxylic acid employed directly effects the amount of ring opening obtained, and using more than about 1 mole of carboxylic acid per mole of olefinic unsaturation desired to be epoxidized, often results in excessive ring opening. Lower amounts of carboxylic acid than about 0.25 mole per mole of ethylenic unsaturation may be employed, but are not advantageous, since the reaction rate is reduced.

When using a reaction zone having peracid reservoir zones, it is generally advisable to introduce the aliphatic carboxylic acid directly into the reservoir zone. These entry points introduce the acid directly into a water phase, thereby reducing unwanted dissolution of it in the ethylenic compound. Additionally, such direct introduction increases the concentration of carboxylic acid in the peracid reservoir zone, which results in a higher yield of carboxylic peracid. The aliphatic carboxylic acid may be introduced into the side of the columns at locations other than the reservoir zones if desired, particularly where a plurality of such entry points is desired.

A strong acid catalyst, e.g. sulfuric acid or phosphoric acid, may be added to catalyze the formation of peracid. The amount of acid catalyst added varies with the particular carboxylic acid employed. For example, when formic acid is used as the carboxylic acid, either 96% sulfuric acid in amounts from 0 to 5% by weight, or 85% phosphoric acid in amounts from 0 to 50% by weight, may be added to the column. Similarly, if acetic acid is utilized as the carboxylic acid, 96% sulfuric acid in amounts from 0.5 to 5% by weight, or 85% phosphoric acid in amounts from 1 to 50% by weight are suitable. The percent acid added is based on the total weight of both hydrogen peroxide and carboxylic acid added to the reaction zone.

The rate of flow of the ethylenic material through the column depends upon the physical dimensions and volume of the column. It has been determined that the residence time of the ethylenic material in the column should be from about 0.9 hour to 5.4 hours to secure optimum results. While longer hold-up times may be employed, they result in proportionally greater amounts of ring opening as well as higher epoxidation rates, and are therefore not desirable. The dimensions and length of the column, and the packing therein, should be chosen so that sufficient contact between the two phases takes place within the preferred residence times of 0.9 to 5.4 hours. A column having an inner diameter of about one inch, filled with a packing of 6 mm. inch Berl saddles and having a length of from 12 to 27 feet, has been found to give sufficient contact between the two phases. Shorter columns will also operate; however, the amount of epoxidation obtained in these shorter columns is diminished. It should be realized, however, that the length of the column required for the operation may vary with the type of column employed.

It has been determined that nonreactive water immiscible solvents, particularly hydrocarbons, may be employed in the system to reduce viscosity, and to adjust other physical properties of the system which effect mass contact in the reaction zone. A solvent such as n-heptane has been found helpful in epoxidizing certain viscous feeds such as soybean oil, when added to the ethylenic feed. The solvent also facilitates the maintaining of a constant temperature of reaction. Dense solvents such as bromoform, carbon tetrachloride and perchloroethylene may also be employed for the ethylenic compound, particularly where it is desired to add the ethylenic compound at the top of the reaction column and the hydrogen peroxide, at the bottom of the column. Additionally, other additives such as surfactants may be added to either the oil or water phase in amounts of about .2% by weight of the phase to which it is added. Surfactants such as alkyl aryl polyether alcohols and alkyl aryl sulfonates have been added to the oil and water phases respectively, to provide improved interfacial area.

The invention will now be described more particularly with reference to the attached drawings. It will be understood that it is not intended to restrict the invention to the embodiments shown therein. In the drawings, FIGURE 1 represents a packed column with peracid reservoir zones; and FIGURE 2 represents a rotating disc baffled-type of column.

In FIGURE 1, 10, 12, 14 and 16 represent sections of a reaction column 86. The tops of these sections are joined by elbows 18, 20 and 22, to the preceding sections, through the sides of the preceding sections at points substantially above the base of each section. This forms depressed sections, or reservoirs, 24, 26 and 28, in the column. At the bases of these reservoirs are overflow tubes 30, 32 and 34 having upturned ends which extend from the reservoirs to the interiors of the succeeding sections. Each of the sections 10, 12, 14 and 16 also has a wire screen 36 at its upper and lower portions, with packing material 38 contained between the screens. The column 36 has an upper outlet pipe 40 and a lower outlet pipe 42 connected to an enlongated line 44.

A container 46 holds a first reaction which flows through a valve 48 and rotameter 50 into entrance line 52, and into the base of the column at 54. A second container 56 holds a second reactant which flows into the peracid reservoirs 24, 26 and 28, through valves 58, 64, and 70, into rotameters 60, 66, and 72, and thence through lines 62, 68 and 74 to the respective reservoirs.

A third container 76 holds a third reaction fluid which flows through valve 78 into rotameter 80, and into line 82, entering the top of the column at 84. Conventional heating and cooling means, not shown, may be employed to maintain the desired reaction temperature.

The process operates in the column shown in FIGURE 1 as follows:

The ethylene compound flows from container 46 through valve 48 and into rotameter 50, where its rate of flow is measured. The metered rate of ethylene material then flows into line 52 and is introduced into the base of the column through opening 54. Upon entering the base of the column the ethylenic feed passes upwardly through an aqueous layer 88 which contains the aliphatic carboxylic acid employed and is thereby purged of any water-soluble impurities.

Simultaneously, aqueous hydrogen peroxide and the aliphatic carboxylic acid are introduced into the column as follows; aqueous hydrogen peroxide, preferably 50% by weight hydrogen peroxide, present in container 76 flows through valve 78 and into rotameter 80, where its rate of flow is measured. The metered hydrogen peroxide solution then flows into line 82 and is introduced into the top of the column through opening 84. The aliphatic carboxylic acid, mixed with a small amount of mineral acid as catalyst, flows from container 56 through valves 58, 64 and 70 and into rotameters 60, 66 and 72 where the rates of flow are measured. The metered acid mixture then flows through lines 62, 68 and 74 and is introduced into the column through the reservoir zones 24, 26 and 28.

After the ethylenic compound passes through the water layer 88, it flows upwardly and is contacted by a number of discontinuous aqueous droplets containing hydrogen peroxide, carboxylic acid, and percarboxylic acid obtained by the reaction of these latter compounds. The ethylenic compound reacts with, and is epoxidized by, the percarboxylic acid and carboxylic acid is given off in the reaction. The regenerated carboxylic acid then combines with additional hydrogen peroxide in an aqueous medium to form more percarboxylic acid. However, some of the carboxylic acid undesirably dissolves in the ethylenic unsaturated compound and is carried upward with it.

The aqueous hydrogen peroxide and carboxylic acid flow downwardly through the column as aqueous droplets and are caught by reservoirs 24, 26 and 28. In these quiescent reservoir zones, the aqueous solution of hydrogen peroxide and carboxylic acid are permitted to stand in order to produce the corresponding percarboxylic acid in quantities approaching equilibrium. As new aqueous droplets collect in reservoirs 24, 26 and 28, the equilibrium mixtures therein overflow through tubes 30, 32 and 34 and flow downwardly in the succeeding section of the column, in countercurrent to the ethylenic compound. A layer of aqueous solution 88 is maintained in the base of the column, and excess aqueous solution is removed through lines 42 and 44. This system continues as heretofore described until the ethylenic compound passes the highest point of entry from the carboxylic acid 24. Thereafter, the aqueous droplets from 84 which contact the ethylenic compound in section 10 of column 36 contain hydrogen peroxide, but no carboxylic acid. The result is a selective extraction of the carboxylic acid dissolved in the ethylenic compound throughout uppermost section 10. Any subsequent epoxidation reaction which takes place in section 10 of column 36 does so without a high concentration of the carboxylic acid being dissolved in the ethylenic compound, because the aqueous hydrogen peroxide retains the extracted carboxylic acid. The epoxidized product is then removed through line 40.

In FIGURE 2, 100 represents a reaction column, having a plurality of baffle rings 102. An outlet line 104 is present at top of the column having opening 106. Another outlet line 108 is present at the base of the column, with opening 11. A motor 112 rotates a shaft 114 to which are fastened a series of spacer discs 116 which rotate with the shaft 114.

Container 118 holds an initial reaction fluid which flows through valve 120, into rotameter 122 and into line 124, and ultimately into the column at 126. A second container 128 holds a second reaction fluid which flows through valves 130, 138 and 146 into rotameters 132, 140 and 148 and thence into lines 134, 142 and 150 until it enters the side of the column at points 136, 144 and 152. A third container 154 holds a third reactant which flows through valve 156, into rotameter 158, through line 160 and enters the top of the column through opening 162. Conventional heating and cooling means, not shown, are employed to maintain the desired reaction temperature.

The process operates in the column shown in FIGURE 2 in a similar manner to that described in FIGURE 1, except that the rotating spacer discs 116 and baffle rings 102 take the place of the packing shown in FIGURE 1. Additionally, the column illustrated in FIGURE 2 does not have reservoir zones. However, if such reservoirs are desired they may be included by employing a plurality of these rotating disc baffled-type columns to serve in place of the packed sections 10, 12, 14 and 16 illustrated in FIGURE 1, and placing the acid entry tubes directly into the reservoirs 24, 26 and 28 as shown in FIGURE 1.

EXAMPLE 1

A glass reaction column of the type shown in FIGURE 1 having an inside diameter of 1 5/16 inch, and packed with 6 mm. Berl saddles was employed in this example. The column had six equally spaced peracid reservoir zones of the type illustrated in FIGURE 1 by 24, 26 and 28, and each was equipped with a separate feed tube for the direct addition of an aliphatic carboxylic acid into any or all of these peracid reservoir zones. The column had a total length of 16 feet and had a capacity of about 3500 cc. when filled with the 6 mm. Berl saddle packing.

An ethylenic feed comprising butyl oleate was added to the base of the column at a rate of 16.6 cc. per minute. Its total residence time in the column was 3.2 hours. Hydrogen peroxide was added at the top of the column as a 50% by weight aqueous solution, through a modified Herschberg funnel, at a rate of 2.91 cc. per minute. The aliphatic carboxylic acid employed was glacial acetic acid; it was mixed with 96.4% sulfuric acid to yield a solution containing 5.6% by weight of sulfuric acid. This acid solution was added to the highest peracid reservoir zone 24 in the column at a rate of 1.43 cc. per minute. The column was maintained at temperatures between 57° and 76° C., and at atmospheric pressure. The aqueous solution which collected in the base of the reactor was maintained between 1.8 to 2.0 feet above the base of the column. The epoxidized product recovered from the top of the column was analyzed, and the results obtained are given in Table I.

EXAMPLE 2

A glass reaction column of the type shown in FIGURE 1 having an inside diameter of 1 5/16 inch, and packed with 6 mm. Berl saddles was employed in this example. The column had six equally spaced peracid reservoir zones of the type illustrated in FIGURE 1 by 24, 26 and 28, and each was equipped with a separate feed tube for the direct addition of an aliphatic carboxylic acid into any or all of these peracid reservoir zones. The column had a total length of 16 feet, and had a capacity of about 3500 cc. when filled with the 6 mm. Berl saddle packing.

An ethylenic feed comprising soybean oil plus heptane (25% by volume) was added to the base of the column at a rate of 22.14 cc. per minute. Its total residence time in the column was 2.6 hours. Hydrogen peroxide was added at the top of the column as a 50% by weight aqueous solution at a rate of 5.1 cc. per minute. The aliphatic carboxylic acid employed was glacial acetic acid; it was mixed with 85% phosphoric acid to yield a solution containing 7.27% by weight phosphoric acid. This acid solution was added to the first, third, and fifth peracid reservoir zones at a rate of 0.70 cc. per minute. The peracid reservoir zones are numbered commencing from the highest zone to the lowest zone. The column was maintained at temperatures between 65° and 70° C., and at atmospheric pressure. The aqueous solution which collected in the base of the reactor was maintained at about 2 feet above the base of the column. The epoxidized product recovered from the top of the column was analyzed and the results obtained are given in Table I.

EXAMPLE 3

A glass reaction column of the type shown in FIGURE 1 having an inside diameter of 2 inches, and packed with 6 mm. Berl saddles was employed in this example. The column had 10 equally spaced peracid reservoir zones of the type illustrated in FIGURE 1 by 24, 26 and 28, and each was equipped with a separate feed tube for the direct addition of an aliphatic carboxylic acid into any or all of these peracid reservoir zones. The column had a total length of 27 feet and had a capacity of about 19,500 cc. when filled with the 6 mm. Berl saddle packing.

An ethylenic feed comprising soybean oil plus heptane (25% by volume) was added to the base of the column at a rate of 120 cc. per minute. Its total residence time in the column was 2.5 hours. Hydrogen peroxide was added at the top of the column as a 50% by weight aqueous solution, at a rate of 25.9 cc. per minute. The aliphatic carboxylic acid employed was formic acid; it was mixed with 85% phosphoric acid to yield a solution of 5% by weight phosphoric acid. This acid solution was added to the first, fourth, and seventh peracid reservoir zones at rates of 6.45, 4.30 and 2.15 cc. per minute respectively. The peracid reservoir zones are numbered commencing from the highest zone to the lowest zone. The column was maintained at temperatures between 65° and 70° C., and at atmospheric pressure. The aqueous solution which collected in the base of the reactor was maintained at about 2 feet above the base of the column. The epoxidized product recovered from the top of the column was analyzed, and the results obtained are given in Table I.

EXAMPLE 4

A glass reaction column of the type shown in FIGURE 1 having an inside diameter of 2 inches, and packed with 6 mm. Berl saddles was employed in this example. The column had 10 equally spaced peracid reservoir zones of the type illustrated in FIGURE 1 by 24, 26, and 28, and each was equipped with a separate feed tube for the direct addition of an aliphatic carboxylic acid into any or all of these peracid reservoir zones. The column had a total length of 27 feet and had a capacity of about 19,500 cc. when filled with the 6 mm. Berl saddle packing.

An ethylenic feed comprising methyl oleate was added to the base of the column at a rate of 120 cc. per minute. Its total residence time in the column was 2.5 hours. Hydrogen peroxide was added at the top of the column as a 50% by weight aqueous solution, at a rate of 17 cc. per minute. The aliphatic carboxylic acid employed was glacial acetic acid; it was mixed with 96.4% sulfuric acid to yield a solution of 5% by weight sulfuric acid. This acid solution was added to the first, third, fifth, and seventh peracid reservoir zones at rates of 3.4, 1.7, 1.0, and 0.7 cc. per minute respectively. The peracid reservoir zones are numbered commencing from the highest zone to the lowest zone. The column was maintained at temperatures between 65° and 70° C., and at atmospheric pressure. The aqueous solution which collected in the base of the reactor was maintained at about 2 feet above the base of the column. The epoxidized product recovered from the top of the column was analyzed, and the results obtained are given in Table I.

EXAMPLE 5

Nine and two tenths grams of glacial acetic acid was mixed with 100% ethane sulfonic acid to yield a solution containing 13% by weight of ethane sulfonic acid. This solution was mixed with 100 grams of butyl oleate in a reaction vessel equipped with a reflux condenser, a thermometer, and a mechanical stirrer. The above mixture was agitated for two hours, during which time 21.7 grams of aqueous hydrogen peroxide containing 50% by weight hydrogen peroxide was added. An electric heating jacket and a cooling bath were employed to maintain the temperature between 60 and 65° C. The reaction was continued for 9 hours after addition of all reagents, and thereafter the product was recovered and analyzed. The results obtained are given in Table I.

*Table I*

| Example | 1[a] | 2[a] | 3[b] | 4[b] | 5 |
|---|---|---|---|---|---|
| Points of Acid Addition | 1 | 1, 3, 5 | 1, 4, 7 | 1, 3, 5, 7 | |
| Average Temperature, °C | 61.3 | 62.5 | 67.5 | 67.5 | 60-65 |
| Reaction Time, Hours | 3.2 | 2.6 | 2.5 | 2.5 | 11 |
| Molar Ratios: | | | | | |
| (1) Double Bond | 1.0 | 1.0 | 1.0 | 1.0 | 1.0 |
| (2) Acid | 0.58 | 0.80 | 0.70 | 0.50 | 0.50 |
| (3) $H_2O_2$ | 1.22 | 1.08 | 1.05 | 1.08 | 1.1 |
| (4) Percent Epoxy Conversion | 65.0 | 50.5 | 92 | 90 | 79.5 |
| (5) Percent Ring Opening | 5.5 | 6.2 | 5 | 5 | 12.4 |
| (6) Unreacted Double Bond | 29.5 | 43.3 | 3 | 5 | 8.1 |
| (7) Moles of Active Oxygen Recovered per Mole of $-C=C-$ | 0.30 | 0.24 | 0.02 | 0.03 | 0.05 |
| (8) Moles of Active Oxygen Decomposed per Mole of $-C=C-$ | 0.22 | 0.27 | 0.06 | 0.10 | 0.13 |

[a] Column Length was 16 feet.
[b] Column Length was 27 feet.

The reseults of Examples 1 to 5, tabulated in Table I, clearly show that undesirable ring opening obtained by the instant process as exemplified by Examples 1 to 4, is at least 50% less than the results obtained by a typical batch system, as exemplified by Example 5. Further, the reaction time has been reduced from 11 hours in the batch process (Example 5) to about 2.5 to 3.5 hours for the present process (Examples 1-4).

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

We claim:

1. In the process of epoxidizing a compound containing an epoxidizable ethylenic group selected from the class consisting of ethylenically unsaturated acids, esters, alcohols, and hydrocarbons by the reaction of said compound with in situ produced carboxylic peracid, the improvement which comprises introducing said compound into one end of an elongated reaction zone, introducing aqueous hydrogen peroxide into the other end of said reaction zone, introducing into said reaction zone intermediate the ends of said reaction zone, a saturated aliphatic carboxylic acid containing from 1 to 8 carbon atoms, passing said compound in intimate, continuous countercurrent contact with an aqueous phase containing as essential ingredients said carboxylic acid, said hydrogen peroxide, and carboxylic peracid produced by the in situ reaction of said hydrogen peroxide and said carboxylic acid in said reaction zone while dispersing gases present in the reaction zone, maintaining the temperature of said reaction zone below about 100° C., removing epoxidized product from one end of said reaction zone, and removing an aqueous solution from the other end of said reaction zone.

2. The process of claim 1, in which the saturated aliphatic carboxylic acid is present in the amount of about 0.25 to about 1 mole per mole of ethylenic unsaturation to be epoxidized.

3. The process of claim 2 in which the temperature of the reaction zone is maintained between 30° to 100° C.

4. The process of claim 3 where the saturated aliphatic carboxylic acid contains from 1 to 3 carbon atoms.

5. In the process of epoxidizing a compound containing an epoxidizable ethylenic group selected from the class consisting of ethylenically unsaturated acids, esters, alcohols, and hydrocarbons by the reaction of said compound with in situ produced carboxylic peracid, the improvement which comprises introducing said compound into one end of an elongated reaction zone, introducing aqueous hydrogen peroxide containing 45 to 55 percent by weight of hydrogen peroxide into the other end of said reaction zone, said hydrogen peroxide being present in the amount of from 1.0 to 1.2 moles per mole of ethylenic unsaturation in said compound to be epoxidized, introducing into said reaction zone intermediate the ends of said reaction zone a saturated, aliphatic carboxylic acid containing from 1 to 3 carbon atoms, in the amount of from about 0.25 to about 1 mole per mole of ethylenic unsaturated in said compound to be epoxidized and a catalytic amount of a strong acid catalyst, passing said compound in intimate, continuous, countercurrent contact with an aqueous phase containing as essential ingredients said carboxylic acid, said hydrogen peroxide, said strong acid catalyst, and the carboxylic peracid produced by the in situ reaction of said hydrogen peroxide and said carboxylic acid in said reaction zone while dispersing gases present in the reaction zone, maintaining the temperature of said reaction zone between 50° and 90° C., removing epoxidized product from one end of said reaction zone, and removing an aqueous solution from the other end of said reaction zone.

6. The process of claim 5 where the saturated aliphatic carboxylic acid is acetic acid.

7. The process of claim 5 where the saturated aliphatic carboxylic acid is formic acid.

8. In the process of epoxidizing a compound containing an epoxidizable ethylenic group selected from the class consisting of ethylenically unsaturated acids, esters, alcohols, and hydrocarbons by the reaction of said compound with in situ produced carboxylic peracid, the improvement which comprises introducing said compound into the lower end of an elongated reaction zone having an upper end and a lower end introducing aqueous hydrogen peroxide into the upper end of said reaction zone, introducing into said reaction zone intermediate the ends of said reaction zone a saturated aliphatic carboxylic acid containing from 1 to 8 carbon atoms and a catalytic amount of a strong acid catalyst, passing said compound upwardly through said reaction zone, passing an aqueous phase downwardly and in intimate, continuous, countercurrent contact with said compound, said aqueous phase containing as essential ingredients said carboxylic acid, said hydrogen peroxide, said strong acid catalyst, and the carboxylic peracid produced by the in situ reaction of said hydrogen peroxide and said carboxylic acid while dispersing gases present in the reaction zone, interrupting the downward flow of said aqueous phase in a peracid reservoir zone, retaining said aqueous phase in said peracid reservoir zone wherein the concentration of said carboxylic peracid is increased by reaction of said hydrogen peroxide and said saturated aliphatic carboxylic acid, continually displacing the aqueous mixtures in said peracid reservoir zone with said downward flowing aqueous phase, flowing said displaced aqueous mixture downwardly in continuous countercurrent contact with said compound, maintaining the temperature of said reaction zone below about 100° C., removing epoxidized product from the upper end of said reaction zone, and removing an aqueous solution from the lower end of said reaction zone.

9. In the process of epoxidizing a higher unsaturated fatty ester, said ester containing as the alcohol moiety a straight chained, aliphatic, residue containing 1 to about 18 carbon atoms by the reaction of said compound with in situ produced carboxylic peracid, the improvement which comprises introducing said compound into the lower end of a reaction zone having an upper end and a lower end, introducing aqueous hydrogen peroxide containing 45 to 55 percent by weight hydrogen peroxide into the upper end of said reaction zone, said hydrogen peroxide being present in amounts of from 1.0 to 1.2 moles per mole of ethylenic unsaturation to be epoxidized in said compound, introducing into said reaction zone intermediate the ends of said reaction zone a saturated aliphatic carboxylic acid containing from 1 to 3 carbon atoms, in the amount of from about 0.25 to about 1 mole per mole of ethylenic unsaturation in said compound to be epoxidized and a catalytic amount of sulfuric acid, passing said compound upwardly through said reaction zone, passing an aqueous phase downwardly and in intimate, continuous, countercurrent contact with said compound, said aqueous phase containing as essential ingredients said carboxylic acid, said hydrogen peroxide and the corresponding carboxylic peracid produced by the in situ reaction of said hydrogen peroxide and said carboxylic acid while dispersing gases present in the reaction zone, continuously interrupting the downward flow of said aqueous phase in a plurality of peracid reservoir zones wherein said carboxylic peracid is reformed by the reaction of said hydrogen peroxide and said saturated aliphatic carboxylic acid, continuously displacing the aqueous mixtures in said peracid reservoir zones with said downwardly flowing aqueous phase, flowing said displaced aqueous mixture downwardly in continuous countercurrent contact with said compound, maintaining the temperature of said reaction zone between 50° and 90° C., removing epoxidized product at the upper end of said reaction zone, and removing an aqueous solution from the lower end of said reaction zone.

References Cited in the file of this patent
UNITED STATES PATENTS 2,873,283    Yang _____ Feb. 10, 1959

UNITED STATES PATENT OFFICE

CERTIFICATE OF CORRECTION

Patent No. 3,065,246 November 20, 1962

Harold K. Latourette et al.

It is hereby certified that error appears in the above numbered patent requiring correction and that the said Letters Patent should read as corrected below.

Column 3, line 31, for "to" read -- of --; column 5, line 45, for "pecial" read -- special --; column 7, line 68, for "from" read -- for --; column 10, Table I, item No. 6, before "Unreacted" insert -- Precent --; column 11, line 41, for "unsaturated" read -- unsaturation --.

Signed and sealed this 24th day of September 1963.

(SEAL)
Attest:

ERNEST W. SWIDER
Attesting Officer

DAVID L. LADD
Commissioner of Patents